US011009837B2

(12) United States Patent
Shinoda et al.

(10) Patent No.: US 11,009,837 B2
(45) Date of Patent: May 18, 2021

(54) MACHINE LEARNING DEVICE THAT ADJUSTS CONTROLLER GAIN IN A SERVO CONTROL APPARATUS

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanshi (JP)

( * ) Notice: Subject to any disclaimer, the term of this patent is extended or adjusted under 35 U.S.C. 154(b) by 1 day.

(21) Appl. No.: 15/976,427

(22) Filed: May 10, 2018

(65) Prior Publication Data

US 2018/0335758 A1    Nov. 22, 2018

(30) Foreign Application Priority Data

May 16, 2017   (JP) ............................. JP2017-097527

(51) Int. Cl.
*G06N 20/00*    (2019.01)
*G05B 13/02*    (2006.01)

(52) U.S. Cl.
CPC ......... *G05B 13/0265* (2013.01); *G06N 20/00* (2019.01)

(58) Field of Classification Search
CPC ...... G06N 99/005; G06N 5/025; G06N 7/005; G06N 20/00; G06N 20/10; G06K 9/6256; G06K 9/6269

(Continued)

(56) References Cited

U.S. PATENT DOCUMENTS

| 6,529,816 | B1* | 3/2003 | Yamaguchi | ........... | F02D 11/105 |
| | | | | | 700/48 |
| 2015/0031969 | A1 | 1/2015 | Khair | | |
| 2017/0111000 | A1* | 4/2017 | Saito | ....................... | H02P 29/60 |

FOREIGN PATENT DOCUMENTS

| CN | 106338967 | 1/2017 |
| CN | 106411216 | 2/2017 |

(Continued)

OTHER PUBLICATIONS

Galbraith et al.—"A neural network-based exploratory learning and motor planning system for co-robots"—2015—https://www.ncbi.nlm.nih.gov/pmc/articles/PMC4511843/ (Year: 2015).*

(Continued)

*Primary Examiner* — Viker A Lamardo
(74) *Attorney, Agent, or Firm* — Wenderoth, Lind & Ponack, L.L.P.

(57) ABSTRACT

A machine learning device that performs reinforcement learning with respect to a servo control apparatus that controls target device having a motor, including: outputting action information including adjustment information of coefficients of a transfer function of a controller gain to a controller included in the servo control apparatus; acquiring, from the servo control apparatus, state information including a deviation between an actual operation of the target device and a command input to the controller, a phase of the motor, and the coefficients of the transfer function of the controller gain when the controller operates the target device based on the action information; outputting a value of a reward in the reinforcement learning based on the deviation included in the state information; and updating an action-value function based on the value of the reward, the state information, and the action information.

7 Claims, 7 Drawing Sheets

(58) Field of Classification Search
USPC .......................................................... 706/12
See application file for complete search history.

(56) References Cited

FOREIGN PATENT DOCUMENTS

| CN | 106411224 | 2/2017 |
|----|-----------|--------|
| CN | 106612088 | 5/2017 |
| DE | 10 2016 008 990 | 3/2017 |
| JP | 01-298977 | 12/1989 |
| JP | 7-210207 | 8/1995 |
| JP | 2006-238663 | 9/2006 |
| JP | 2017-79514 | 4/2017 |

OTHER PUBLICATIONS

Harmon et al.—"Reinforcement Learning: A Tutorial"—2016—https://web.archive.org/web/20160910001525/http://www.cs.toronto.edu/-zemel/documents/411/rltutorial.pdf (Year: 2016).*

Darshan Thakar—"Problems Associated with Inverter Driven Induction Motor and it's Solution"—2016—http://socet.edu.in/socet/wp-content/uploads/2018/03/Sarjan-July-2016-5TH-Edition.pdf (Year: 2016).*

Priyanka—"Analysis of Vibrations in Induction Motors"—Jan 2017—https://www.semanticscholar.org/paper/Analysis-Of-Vibrations-In-Induction-Motors-Using-Priyanka-Assistant/6a238fd51aefcbde9edd52f73ccd1aec200c3363?p2df (Year: 2017).*

Jinlin et al. - "Reinforcement Learning for Engine Idle Speed Control" - 2010 - https://www.researchgate.net/publication/224136221 Reinforcement Learning for Engine Idle Speed Control (Year: 2010).*

Aderiano M. da Silva - "Induction Motor Fault Diagnostic and Monitoring Methods" - 2006 - http://kidlab.eece.nnu.edu/publications/ papers/dasilva.pdf (Year: 2006).*

Office Action dated Apr. 10, 2019 in Chinese Patent Application No. 201810444852.8.

Tong Liu, I. Husain, M. Elbuluk: Torque ripple minimization with on-line parameter estimation using neural networks in permanent magnet synchronous motors. Conference Record of 1998 IEEE Industry Applications Conference. Thirty-Third IAS Annual Meeting, vol. 1, 1998, 35-40. IEEE [online].

Office Action dated Oct. 10, 2019 in DE Patent Application No. 10 2018 003 769.0.

* cited by examiner

MACHINE LEARNING DEVICE THAT ADJUSTS CONTROLLER GAIN IN A SERVO CONTROL APPARATUS

This application is based on and claims the benefit of priority from Japanese Patent Application No. 2017-097527, filed on 16 May 2017, the content of which is incorporated herein by reference.

BACKGROUND OF THE INVENTION

Field of the Invention

The present invention relates to a machine learning device, a servo control apparatus, and a machine learning method for performing machine learning related to servo control.

Related Art

Conventionally, a technique of appropriately controlling a machine tool or the like serving as a servo control target by performing machine learning related to servo control is known. For example, in the technique disclosed in Patent Document 1, a load, a temperature, and a vibration of a main shaft are observed as a state. A value function for correcting an operation command is learned by reinforcement learning based on this observed state. After learning ends, by using the value function learned in this manner, it is possible to correct the operation command according to a situation without requiring any correction operation of an operator.
Patent Document 1: Japanese Unexamined Patent Application, Publication No. H7-210207

SUMMARY OF THE INVENTION

However, when a motor such as a servo motor is driven, the inductance of the motor changes according to the phase of the motor. Due to this, if a controller gain for controlling driving a motor remains constant, the motor rotates unevenly with a change in the inductance. In order to suppress uneven rotation, it is necessary to adjust the controller gain according to the phase of the motor. However, according to an ordinary technique, adjustment of the controller gain according to the phase of a motor is not performed. For example, in the technique disclosed in Patent Document 1, although it is described that the operation command supplied to a machine tool is corrected according to a load, a temperature, and a vibration, consideration of the motor's phase and adjustment of a controller gain are not described. Even if the adjustment of a controller gain is performed according to an ordinary technique, the adjustment is not easy since the motor's phase changes instantaneously in a very short time.

With the foregoing in view, an object of the present invention is to provide a machine learning device, a servo control system, and a machine learning method capable of adjusting a controller gain appropriately according to a phase of a motor.

(1) A machine learning device (for example, a machine learning device 100 to be described later) of the present invention is a machine learning device that performs reinforcement learning with respect to a servo control apparatus (for example, a servo control apparatus 200 to be described later) that controls an operation of a control target device (for example, a control target device 300 to be described later) having a motor (for example, a motor 32 to be described later), the machine learning device including: action information output means (for example, an action information output part 13 to be described later) for outputting action information including adjustment information of coefficients of a transfer function of a controller gain to a controller (for example, a position controller 23, a speed controller 25, and a current controller 27 to be described later) included in the servo control apparatus; state information acquisition means (for example, a state information acquiring part 11 to be described later) for acquiring, from the servo control apparatus, state information including a deviation between an actual operation of the control target device and a command input to the controller, a phase of the motor, and the coefficients of the transfer function of the controller gain when the controller operates the control target device on the basis of the action information; reward output means (for example, a reward output part 121 to be described later) for outputting a value of a reward in the reinforcement learning on the basis of the deviation included in the state information; and value function updating means (for example, a value function updating part 122 to be described later) for updating an action-value function on the basis of the value of the reward, the state information, and the action information.

(2) In the machine learning device according to (1), the servo control apparatus may be a servo control apparatus that performs feedback control for correcting the command input to the controller, and the state information acquisition means may acquire a difference between the command input to the controller and a feedback value of the feedback control as the deviation.

(3) In the machine learning device according to (1) or (2), the controller may be a combination of controllers that perform position control, speed control, and current control, and the machine learning device may select the controller that performs current control, the controller that performs speed control, and the controller that performs position control in that order as a reinforcement learning target when the machine learning device performs the reinforcement learning by selecting any one of the controllers as a target and then perform the reinforcement learning by selecting another controller as a target.

(4) In the machine learning device according to any one of (1) to (3), the phase of the motor may be calculated on the basis of a position command for controlling the operation of the control target device.

(5) In the machine learning device according to any one of (1) to (4), the transfer function of the controller gain may include a phase of the motor as a variable.

(6) A servo control system of the present invention is a servo control system including the machine learning device according to any one of (1) to (5) and the servo control apparatus, in which the servo control apparatus includes phase calculation means (for example, a phase calculating part 21 to be described later) for calculating a phase of the motor on the basis of a position command for controlling an operation of the control target device and outputting the calculated phase of the motor to the state information acquisition means and the controller.

(1) A machine learning method of the present invention is a machine learning method of a machine learning device (for example, a machine learning device 100 to be described later) that performs reinforcement learning with respect to a servo control apparatus (for example, a servo control apparatus 200 to be described later) that controls an operation of a control target device (for example, a control target device 300 to be described later) having a motor (for example, a motor 32 to be described later), the machine learning method including: an action information output step of outputting action information including adjustment information of coefficients of a transfer function of a controller gain to a controller (for example, a position controller 23, a speed controller 25, and a current controller 27 to be described later) included in the servo control apparatus; a state information acquisition step of acquiring, from the servo control apparatus, state information including a deviation between an actual operation of the control target device and a command input to the controller, a phase of the motor, and the coefficients of the transfer function of the controller gain when the controller operates the control target device on the basis of the action information; a reward output step of outputting a value of a reward in the reinforcement learning on the basis of the deviation included in the state information; and a value function updating step of updating an action-value function on the basis of the value of the reward, the state information, and the action information.

According to the present invention, it is possible to adjust the controller gain appropriately according to the phase of a motor.

DETAILED DESCRIPTION OF THE INVENTION

Hereinafter, embodiments according to the present invention will be described in detail with reference to the drawings.

Overall Configuration of Embodiment

Figure 1:
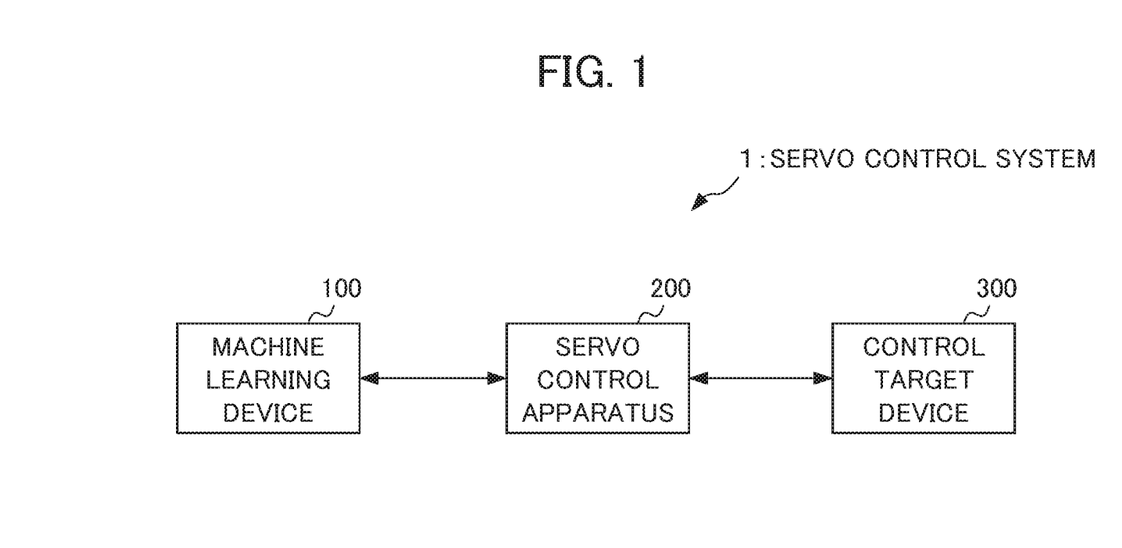
FIG. 1 is a functional block diagram illustrating an overall basic configuration of an embodiment of the present invention.

FIG. 1 is a functional block diagram illustrating an overall configuration of a servo control system 1 which is the present embodiment. As illustrated in FIG. 1, the servo control system 1 includes a machine learning device 100, a servo control apparatus 200, and a control target device 300.

The machine learning device 100 is a device for performing machine learning to adjust a controller gain of the servo control apparatus 200. By the machine learning, the machine learning device 100 obtains optimal coefficients of a transfer function of the controller gain. The machine learning device 100 can be realized by a personal computer, a server device, a computerized numerical control (CNC), or the like.

The servo control apparatus 200 is a device that controls driving of the control target device 300 by performing feedback control. Moreover, the coefficients of the transfer function of the controller gain of the servo control apparatus 200 are adjusted by the machine learning device 100.

The control target device 300 is a device having a servo motor that is driven under the control by the servo control apparatus 200. The control target device 300 can be realized by, for example, a machine tool, a robot, an industrial machine, or the like. The above-described servo control apparatus 200 may be realized as a single device, or may be realized as a part of such a machine tool, a robot, an industrial machine or the like.

The machine learning device 100 and the servo control apparatus 200 are communicably connected to each other. The servo control apparatus 200 and the control target device 300 are also communicably connected to each other. Such communication can be realized by, for example, LAN (Local Area Network) built in a factory. Moreover, such communication may be either wired communication or wireless communication or may be the combination thereof. The communication standard and the like are not particularly limited. Such communication may be performed via a network (not shown) such as the Internet or a public telephone network. In this case, respective devices may be set adjacently to each other (for example, in one factory), or may be set separately in distant places. Although each figure illustrates a single device for each type of these devices, there is no limitation on the number of each type of these devices. In addition, the connection thereof may be of one-to-many or many-to-many connection, not only one-to-one connection.

<Feedback Control>

Next, a detailed configuration of the servo control apparatus 200 and the control target device 300 and the flow of feedback signals will be described with reference to FIG. 2.

Figure 2:
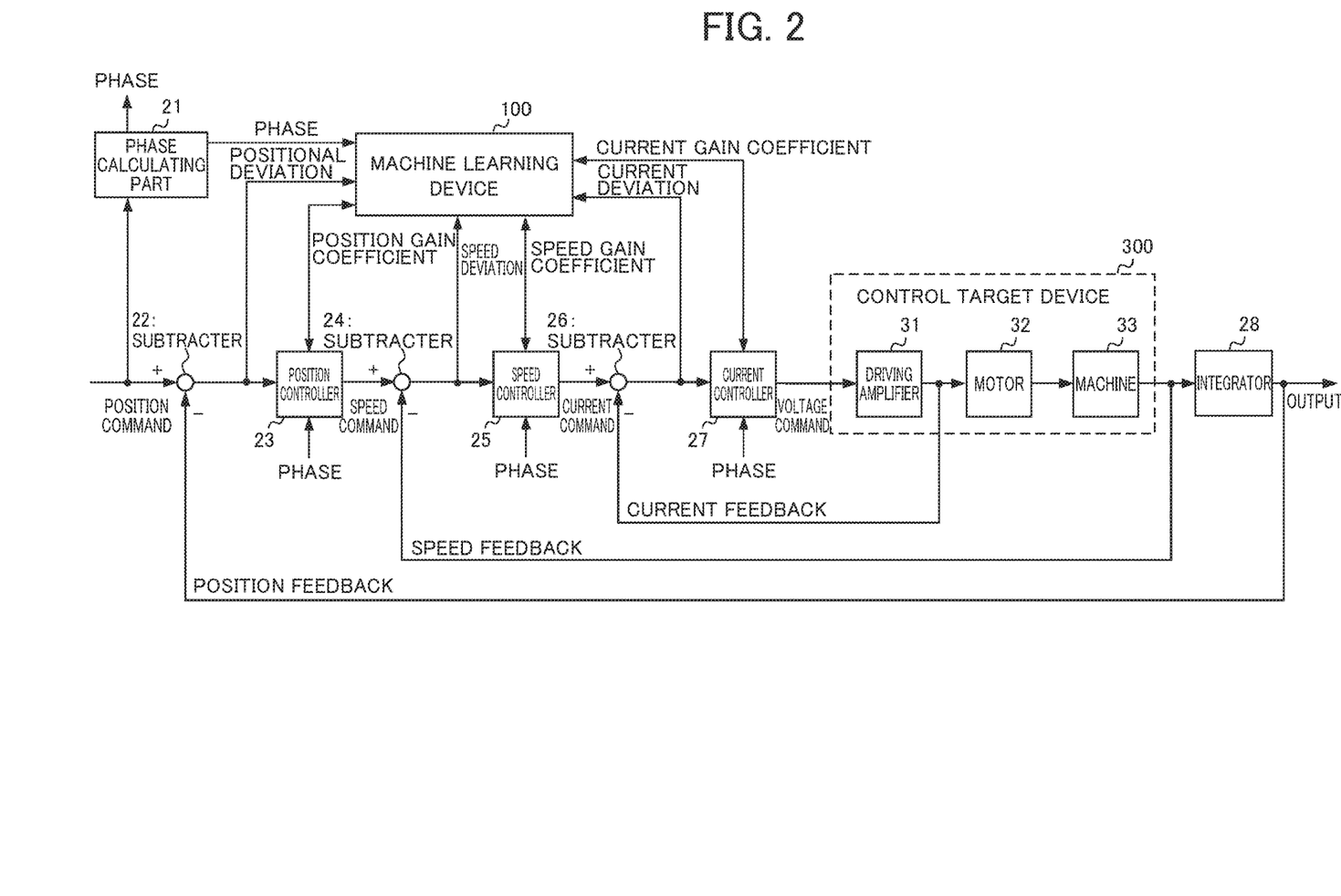
FIG. 2 is a functional block diagram illustrating components of a servo control apparatus, components of a control target device, and the flow of signals according to the embodiment of the present invention.

As illustrated in FIG. 2, the present embodiment includes the machine learning device 100, a phase calculating part 21, a subtractor 22, a position controller 23, a subtractor 24, a speed controller 25, a subtractor 26, a current controller 27, and an integrator 28 which are the components of the servo control apparatus 200, and a driving amplifier 31, a motor 32, and a machine 33 which are the components of the control target device 300. A detailed configuration of the machine learning device 100 will be described later with reference to FIG. 4.

In the present embodiment, the position controller 23, the subtractor 24, and the current controller 27 perform PID control by performing proportional calculation, integral calculation, and differentiation calculation as feedback control. Since a basic operation itself of the servo control apparatus that performs feedback control and PID control is well known to those skilled in the art, the detained description thereof will be omitted.

Next, the flow of signals during machine learning will be described with reference to FIG. 2. The flow of signals related to feedback control will be described first, and the flow of signals related to machine learning will be described next.

First, a position command for controlling driving of the control target device 300 is input to the servo control apparatus 200 from a higher-order device (for example, a numerical controller) or a position command creating part, which is not illustrated. The position command is created on the basis of a program that operates the control target device 300. Here, in the present embodiment, machine learning is performed with respect to an operation in which a rotor of the motor 32 makes one revolution or more in a positive direction and/or a negative direction at a constant speed. Therefore, a position command during the machine learning is a position command to execute such an operation that a rotor of the motor 32 makes one revolution or more in a positive direction and/or a negative direction at a constant speed. The input position command is branched and output to the phase calculating part 21 and the subtractor 22. The position command output to the subtractor 22 is subtracted by a position feedback value in the subtractor 22, and a positional deviation which is a deviation between the position command and the position feedback value is input to the position controller 23. The positional deviation is branched and is also input to the machine learning device 100.

The position controller 23 generates a speed command from the input positional deviation according to a transfer function $K_3(s,\Theta)$ of the controller gain represented by "$K_{3P}(\Theta)+K_{3I}(\Theta)/s+K_{3D}(\Theta)s$" where $K_{3P}(\Theta)$ is a proportional gain, $K_{3I}(\Theta)$ is an integral gain, and $K_{3D}(\Theta)$ is a differential gain, and outputs the generated speed command to the speed controller 25. The variable $\Theta$ of the transfer function of each controller gain is the phase of the motor 32. The phase of the motor 32 is calculated by the phase calculating part 21 and is output to the controllers of the position controller 23, the speed controller 25, and the current controller 27. A method of calculating the phase in the phase calculating part 21 will be described later with reference to FIG. 3. The speed command output by the position controller 23 is subtracted by a speed feedback value in the subtractor 24, and a speed deviation which is a deviation between the speed command and the speed feedback value is input to the speed controller 25. The speed deviation is branched and is also input to the machine learning device 100.

The speed controller 25 generates a current command from the input speed deviation according to a transfer function $K_2(s,\Theta)$ of the controller gain represented by "$K_{2P}(\Theta)+K_{2I}(\Theta)/s+K_{2D}(\Theta)s$" where $K_{2P}(\Theta)$ is a proportional gain, $K_{2I}(\Theta)$ is an integral gain, and $K_{2D}(\Theta)$ is a differential gain, and outputs the generated current command to the current controller 27. The current command output by the speed controller 25 is subtracted by a current feedback value in the subtractor 26, and a current deviation which is a deviation between the speed command and the current feedback value is input to the current controller 27. The current deviation is branched and is also input to the machine learning device 100.

The current controller 27 generates a voltage command from the input current deviation according to a transfer function $K_1(s,\Theta)$ of the controller gain represented by "$K_{1P}(\Theta)+K_{1I}(\Theta)/s+K_{1D}(\Theta)s$" where $K_{1P}(\Theta)$ is a proportional gain, $K_{1I}(\Theta)$ is an integral gain, and $K_{1D}(\Theta)$ is a differential gain, and outputs the generated voltage command to the driving amplifier 31.

The driving amplifier 31 generates a driving current for driving the motor 32 which is a servo motor on the basis of the voltage command and outputs the generated driving current to the motor 32. The driving current is branched and is input to the subtractor 26 as a current feedback value. The subtractor 26 subtracts a current feedback value from an input value as described above.

The motor 32 rotates on the basis of the input driving current. In this way, the machine 33 connected to the motor 32 operates. The machine 33 is a table having a machining target (a work) mounted thereon. In this case, the machine 33 is connected to the motor 32 by a connecting mechanism such as a ball screw (not illustrated). The rotational movement of the motor 32 is converted to linear movement by the ball screw. In this way, the machine 33 moves the machining target (the work) to a predetermined position corresponding to the position command.

Here, a speed detector (not illustrated) is attached to the motor 32. A speed feedback value detected by the speed detector is branched and is output to the subtractor 24 and the integrator 28. The subtractor 24 subtracts the speed feedback value from an input value as described above.

The integrator 28 generates a position feedback value by integrating the speed feedback value. The integrator 28 outputs the generated position feedback value to the subtractor 22. The motor 32 subtracts the position feedback value from an input value as described above.

Here, due to the influence of a load for driving the control target device 300 or a disturbance, a positional deviation occurs between the position command which is a target value and the position feedback value which is an output value. The above-described feedback control is repeatedly performed in order to decrease the positional deviation. Hereinabove, the flow of feedback control has been described.

<Calculation of Phase of Motor 32>

In the present embodiment, as described above, $\Theta$ corresponding to the phase of the motor 32 is included as a variable of the transfer function of the controller gain in order to adjust the controller gain appropriately according to the phase of the motor 32. Next, calculation of the phase of the motor 32 in the phase calculating part 21 will be described with reference to FIG. 3.

Figure 3:
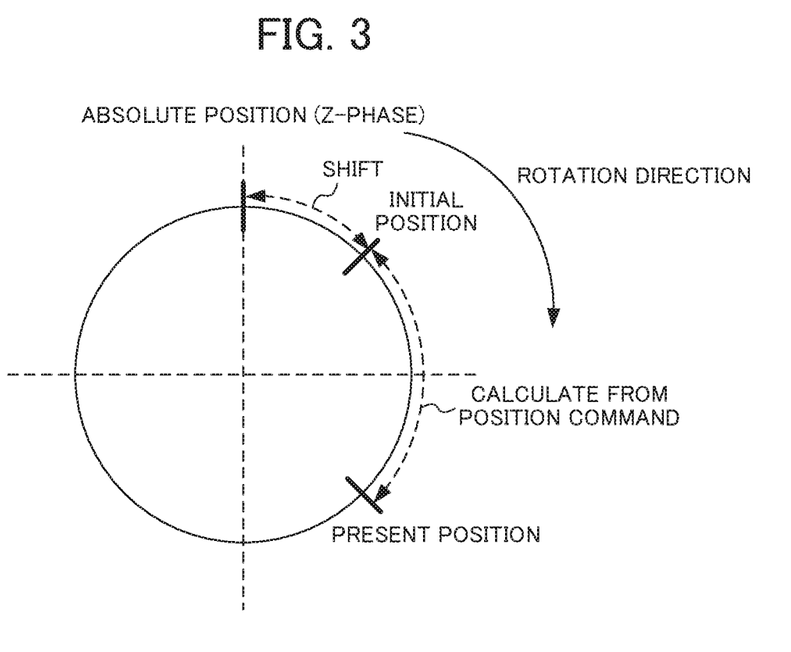
FIG. 3 is a schematic diagram illustrating calculation of a phase of a motor according to the embodiment of the present invention.

In the present embodiment, the phase calculating part 21 calculates the phase of the motor 32 on the basis of the input position command and outputs the calculated phase. As a precondition for this calculation, the phase calculating part 21 stores an absolute position with respect to a rotation position of the motor. Here, the absolute position is referred to as the Z-phase as illustrated in FIG. 3, for example.

On the other hand, generally, a detector for detecting the rotation position is attached to the motor 32. The detector stores a rotation position and the like which are detection results. Specifically, the detector stores data indicating the rotation speed of the motor 32 and data indicating the position within one revolution. In the present embodiment, these pieces of data are sent from the detector to the phase calculating part 21 at the time of power-on, for example. The phase calculating part 21 having received the data can specify an initial position in relation to the absolute position serving as a reference (origin) by computing a difference (that is, a shift from the absolute position) between the stored absolute position (for example, the Z-phase) and the received data indicating the position within one revolution.

When the motor 32 starts rotating on the basis of the position command after the power-on, the phase calculating part 21 calculates the phase of the present position on the basis of the position command. For this, the phase calculating part 21 stores a gear ratio (a movement amount of a distal end of a driving portion of the machine 33 per one revolution of the motor) between the motor 32 and the distal end of the driving portion of the machine 33. From this gear ratio, how much the phase of the motor 32 has changed in relation to the position command supplied to the distal end of the driving portion of the machine 33 is calculated by the following expression (Expression 1).

Motor Phase [deg]=(Position Command [mm])÷ (Gear Ratio [mm/rev])×360   (Expression 1)

The phase calculating part 21 adds the phase calculated from the position command according to the above-mentioned expression to the phase of the initial position in relation to the absolute position serving as a reference (an origin) and outputs the phase obtained by addition to the position controller 23, the speed controller 25, and the current controller 27, respectively, as the phase of the present position. The position controller 23, the speed controller 25, and the current controller 27 substitute the value of the phase of the present position into Θ which is the variable of the transfer function of the controller gain. Signal lines connecting the phase calculating part 21 to the position controller 23, the speed controller 25, and the current controller 27, respectively, is not illustrated.

<Machine Learning>

In parallel with the feedback control, the machine learning of the machine learning device 100 is performed. In order to perform the machine learning, the phase calculating part 21 outputs the phase of the present position to the machine learning device 100. Moreover, in order to realize the machine learning, the coefficients of the transfer function of the present controller gain are input from the position controller 23, the speed controller 25, and the current controller 27 to the machine learning device 100. Furthermore, as described above, the positional deviation, the speed deviation, and the current deviation are also input to the machine learning device 100 in order to realize the machine learning.

Furthermore, the machine learning device 100 outputs the coefficients of the transfer function of the controller gain to the position controller 23, the speed controller 25, and the current controller 27 in order to realize the machine learning. The position controller 23, the speed controller 25, and the current controller 27 output commands according to the coefficients of the transfer function of the controller gain input from the machine learning device 100 and the variable (that is, the phase of the motor 32) of the transfer function of the controller gain input from the phase calculating part 21. The machine learning device 100 performs machine learning on the basis of these input and output values. Specifically, the machine learning device 100 performs reinforcement learning which is one type of machine learning.

Next, a basic structure of reinforcement learning will be described prior to description of functional blocks included in the machine learning device 100. In reinforcement learning, an agent (corresponding to the machine learning device 100 of the present embodiment) observes an environment state and selects a certain action, and an environment changes on the basis of the action. With a change in environment, a certain reward is given and the agent learns selection (decision making) of a better action. While supervised learning outputs a completely correct answer, the rewards in reinforcement learning are often fragmentary values based on a partial change in environment. Due to this, the agent learns to select an action so as to maximize a total future reward.

In this manner, in the reinforcement learning, an appropriate action is learned on the basis of an interaction between actions and environment by learning actions. That is, a method of learning for maximizing a future reward is learned. In the present embodiment, this means that it is possible to obtain such an action that may have an influence in the future as to select action information for reducing a positional deviation, a speed deviation, and a current deviation resulting from a change in inductance of a motor according to a change in the phase.

Here, although an arbitrary learning method can be used as reinforcement learning, in the following description, a case of using Q-learning which is a method of learning a value $Q(s,a)$ of selecting an action a under a certain environment state s will be described as an example. Q-learning aims to select an action a having the highest value $Q(s,a)$ as an optimal action among actions a that could be taken under a certain state s.

However, at an initial time at which the Q-learning starts, the correct value of the value $Q(s,a)$ is not known at all for a combination of the state s and the action a. Therefore, the agent learns the correct value $Q(s,a)$ by selecting various actions a under a certain state s and selecting a better action on the basis of rewards given for the selected actions a.

Since it is desired to maximize a total reward obtained in the future, it is aimed to finally attain a relation of $Q(s,a)=E[\Sigma(\gamma^t)r_t]$. Here, E[ ] indicates an expected value, t indicates time, γ is a parameter called a discount factor to be described later, $r_t$ is a reward at time t, and Σ is the sum at time t. In this expression, the expected value is an expected value when the state were changed according to an optimal action. However, since it is unclear which action is optimal in the process of Q-learning, reinforcement learning is performed while searching for an optimal action by performing various actions. An update expression of such a value $Q(s,a)$ can be represented by the following expression (Expression 2).

[Math. 1]

$$Q(s_{t+1}, a_{t+1}) \leftarrow Q(s_t, a_t) + \alpha\left(r_{t+1} + \gamma \max_a Q(s_{t+1}, a) - Q(s_t, a_t)\right) \quad \text{(Expression 2)}$$

In the above expression (Expression 2), $s_t$ indicates an environment state at time t, and $a_t$ indicates an action $a_t$ time t. By the action $a_t$, the state changes to $s_{t+1}$. $r_{t+1}$ indicates a reward obtained by the change in the state. Moreover, a term with max is a multiplication of the Q value by γ when an action a having the highest Q value known at that moment was selected under the state $s_{t+1}$. Here, γ is a parameter of $0<\gamma\leq1$ and is called a discount factor. Moreover, α is a learning rate of $0<\alpha\leq1$.

The above expression (Expression 2) indicates a method of updating a value $Q(s_t,a_t)$ of an action $a_t$ in a state $s_t$ on the basis of a returning reward $r_{t+1}$ when the action $a_t$ is performed. This update expression indicates that if the value $\max_a Q(s_{t+1},a)$ of the best action in the next state $s_{t+1}$ associated with an action $a_t$ is larger than the value $Q(s_t,a_t)$ of an action $a_t$ in the state $s_t$, $Q(s_t,a_t)$ is increased, and if otherwise, $Q(s_t,a_t)$ is decreased. That is, the value of a certain action in a certain state approaches the value of the best action in the next state associated with the action. However, although this difference differs depending on the discount factor γ and the reward $r_{t+1}$, the value of the best action in a certain state basically propagates to the value of an action in a state previous to that state.

Here, a Q-learning method of creating a $Q(s,a)$ table for all state-action pairs (s,a) to perform learning is known. However, it may take a considerably long time for the Q-learning to converge when the values of $Q(s,a)$ of all state-action pairs are calculated since the number of states is too large.

Thus, an existing technique called a deep Q-network (DQN) may be used. Specifically, the value of the value $Q(s,a)$ may be calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in Non-Patent Document below, for example.

Non-Patent Document

"Human-level control through deep reinforcement learning", Volodymyr Mnih, et al., [online], [retrieved May 8, 2017], Internet <URL:http://files.davidqiu.com/research/nature14236.pdf>"

The machine learning device 100 performs the above-described Q-learning. Specifically, the machine learning device 100 learns a value Q of selecting an action a of adjusting the coefficients of the transfer function of the controller gain of a controller associated with a servo state s including the values of the coefficients of a transfer function of a controller gain of a learning target controller among the position controller 23, the speed controller 25, and the current controller 27 of the servo control apparatus 200 and the phase of the motor 32 and deviation information of the servo control apparatus 200 acquired by executing control according to a position command during learning.

Here, for example, when the transfer function $K_1(s,\Theta)$ $(=K_{1P}(\Theta)+K_{1I}(\Theta)/s+K_{1D}(\Theta)s)$ of the controller gain of the current controller 27, the transfer function $K_2(s,\Theta)$ $(=K_{2P}(\Theta)+K_{2I}(\Theta)/s+K_{2D}(\Theta)s)$ of the controller gain of the speed controller 25, and the transfer function $K_3(s,\Theta)$ $(=K_{3P}(\Theta)+K_{3I}(\Theta)/s+K_{3D}(\Theta)s)$ of the controller gain of the position controller 23 are one-dimensional functions of $\Theta$, respectively, the coefficients of the transfer function of the controller gain are determined by the following expressions (Expression 3).

$$K_{iP}(\Theta)=a_{iP}\cdot\sin(\Theta+b_{iP})+c_{iP}$$

$$K_{iD}(\Theta)=a_{iD}\cdot\sin(\Theta+b_{iD})+c_{iD}$$

$$K_{iD}(\Theta)=a_{iD}\cdot\sin(\Theta+b_{iD})+c_{iD} \quad \text{(Expression 3)}$$

Here, i is an integer of $1 \leq i \leq 3$.

The machine learning device 100 observes state information s which is information including respective deviation information (a current deviation, a speed deviation, and a positional deviation) of the servo control apparatus 200 and the phase of the motor 32 obtained by executing control according to position command during learning and the respective coefficients $a_{iP}$, $b_{iP}$, $c_{iP}$, $a_{iI}$, $b_{iI}$, $c_{iI}$, $a_{iD}$, $b_{iD}$, and $c_{iD}$ ($1 \leq i \leq 3$) of the transfer functions of the controller gains on the basis of the respective coefficients $a_{iP}$, $b_{iP}$, $c_{iP}$, $a_{iI}$, $b_{iI}$, $c_{iI}$, $a_{iD}$, $b_{iD}$, and $c_{iD}$ ($1 \leq i \leq 3$) of the transfer functions of the respective controller gains to determine the action a. The machine learning device 100 returns a reward whenever the action a is executed. The machine learning device 100 searches for the optimal action a so that a total future reward is maximized by trial-and-error learning. By doing so, the machine learning device 100 can select an optimal action a (that is, the optimal coefficients $a_{iP}$, $b_{iP}$, $c_{iP}$, $a_{iI}$, $b_{iI}$, $c_{iI}$, $a_{iD}$, $b_{iD}$, and $c_{iD}$ ($1 \leq i \leq 3$) of a learning target controller among the position controller 23, the speed controller 25, and the current controller 27) with respect to the state information s including a servo state including the respective deviation information of the servo control apparatus 200 obtained by executing control according to a position command during learning on the basis of the respective coefficients $a_{iP}$, $b_{iP}$, $c_{iP}$, $a_{iI}$, $b_{iI}$, $c_{iI}$, $a_{iD}$, $b_{iD}$, and $c_{iD}$ ($1 \leq i \leq 3$) of the transfer function of the controller gain.

In this way, by selecting such an action a that maximizes the value of Q among the actions a applied to the respective coefficients $a_{iP}$, $b_{iP}$, $c_{iP}$, $a_{iI}$, $b_{iI}$, $c_{iI}$, $a_{iD}$, $b_{iD}$, and $c_{iD}$ ($1 \leq i \leq 3$) of the transfer function of the controller gain associated with a certain state s on the basis of the value function Q learned by the machine learning device 100, it is possible to select such an action a (that is, the optimal coefficients $a_{iP}$, $b_{iP}$, $c_{iP}$, $a_{iI}$, $b_{iI}$, $c_{iI}$, $a_{iD}$, $b_{iD}$, and $c_{iD}$ ($1 \leq i \leq 3$) of the position controller 23, the speed controller 25, and the current controller 27) that minimizes the respective deviations.

In the present embodiment, learning is performed sequentially, targeting one controller among the three controllers of the position controller 23, the speed controller 25, and the current controller 27, rather than performing learning simultaneously for the three controllers. This is because it may take a considerable time for the learning to converge if learning is performed simultaneously for the three controllers of the position controller 23, the speed controller 25, and the current controller 27.

Specifically, first, the current controller 27 is selected as a target controller and learning for selecting the optimal coefficients $a_{1P}$, $b_{1P}$, $c_{1P}$, $a_{1I}$, $b_{1I}$, $c_{1I}$, $a_{1D}$, $b_{1D}$, and $c_{1D}$ of the current controller 27 is performed. In this case, since learning has not been performed with respect to the coefficients $a_{iP}$, $b_{iP}$, $c_{iP}$, $a_{iI}$, $b_{iI}$, $c_{iI}$, $a_{iD}$, $b_{iD}$, and $c_{iD}$ ($2 \leq i \leq 3$) of the position controller 23 and the speed controller 25, it is not possible to select optimal coefficients. Therefore, the respective coefficients of the position controller 23 and the speed controller 25 are set arbitrarily (for example, set to fixed values that do not depend on the phase as in the conventional technique) so that the controller gain is adjusted such that the motor 32 operates without any problem such as oscillation. Although trackability with respect to a position and a speed may decrease when the controller gain is adjusted such that the motor 32 operates without any problem such as oscillation, no problem occurs in learning of the current controller 27 since only a current deviation from a current command generated due to deviations is evaluated even when a positional deviation and a speed deviation increase when performing learning of the current controller 27.

After learning of the current controller 27 ends, the speed controller 25 is selected as a target controller and learning for selecting the optimal coefficients $a_{2P}$, $b_{2P}$, $c_{2P}$, $a_{2I}$, $b_{2I}$, $c_{2I}$, $a_{2D}$, $b_{2D}$, and $c_{2D}$ of the speed controller 25 is performed. In this case, since the coefficients of the current controller 27 have been already learned, the optimal coefficients $a_{1P}$, $b_{1P}$, $c_{1P}$, $a_{1I}$, $b_{1I}$, $c_{1I}$, $a_{1D}$, $b_{1D}$, and $c_{1D}$ are selected on the basis of the learning results. The coefficients of the position controller 23 are set arbitrarily (for example, set to fixed values that do not depend on the phase as in the conventional technique) so that the controller gain is adjusted such that the motor 32 operates without any problem such as oscillation.

Furthermore, when learning of the speed controller 25 ends, the position controller 23 is selected as a target controller and learning for selecting the optimal coefficients $a_{3P}$, $b_{3P}$, $c_{3P}$, $a_{3I}$, $b_{3I}$, $c_{3I}$, $a_{3D}$, $b_{3D}$, and $c_{3D}$ of the position controller 23 is performed. In this case, since the respective coefficients of the current controller 27 and the speed controller 25 have been already learned, the optimal coefficients $a_{iP}$, $b_{iP}$, $c_{iP}$, $a_{iI}$, $b_{iI}$, $c_{iI}$, $a_{iD}$, $b_{iD}$, and $c_{iD}$ ($1 \leq i \leq 2$) are selected on the basis of the learning results.

By doing so, it is possible to perform learning with respect to the position controller 23, the speed controller 25, and the current controller 27, respectively, and to select the optimal coefficients of the respective controllers.

<Functional Blocks of Machine Learning Device 100>

Figure 4:
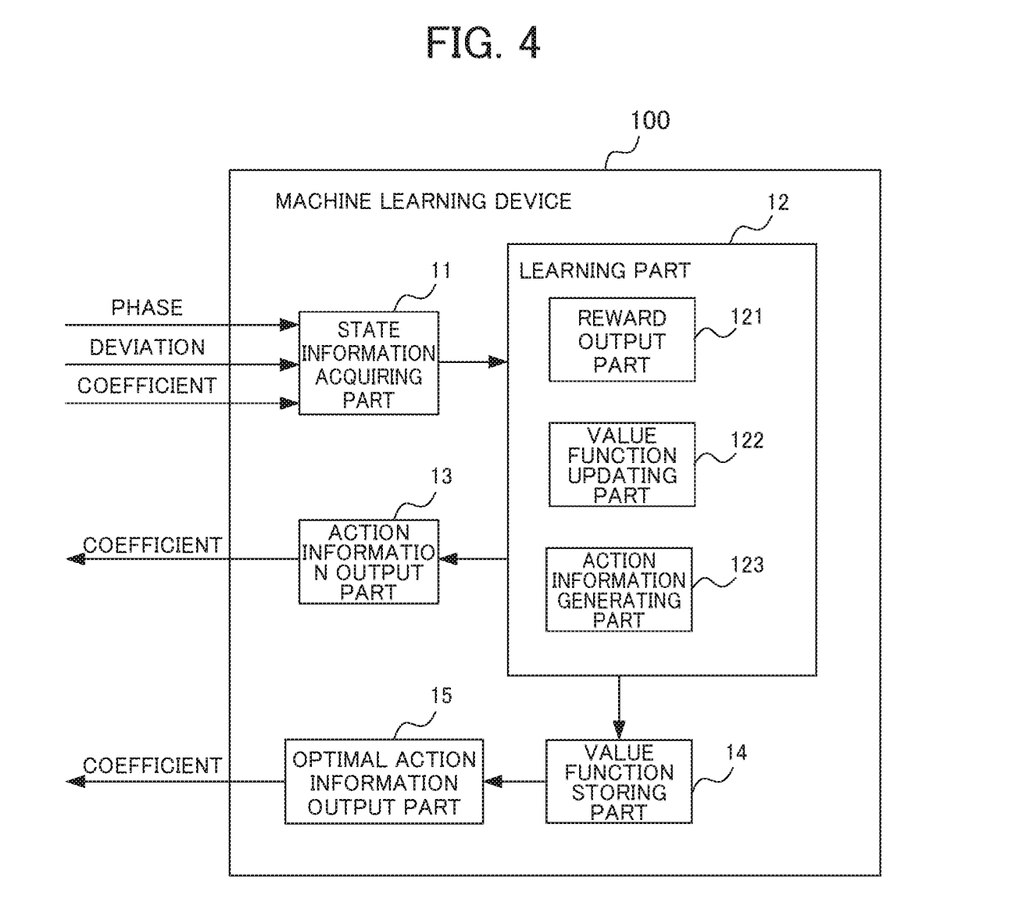
FIG. 4 is a functional block diagram illustrating a configuration of a machine learning device according to the embodiment of the present invention.

Next, the functional blocks of the machine learning device 100 that performs the reinforcement learning will be described with reference to FIG. 4. As illustrated in FIG. 4, the machine learning device 100 includes a state information acquiring part 11, a learning part 12, an action information output part 13, a value function storing part 14, and an optimal action information output part 15 in order to adjust the controller gains of the current controller 27, the speed controller 25, and the position controller 23. The learning part 12 includes a reward output part 121, a value function updating part 122, and an action information generating part 123. Hereinafter, the functional blocks will be described in order of the current controller 27, the speed controller 25, and the position controller 23.

First, learning of the controller gain of the current controller 27 will be described. As described above, the respective coefficients of the position controller 23 and the speed controller 25 are set arbitrarily (for example, set to fixed values that do not depend on the phase as in the conventional technique) so that the controller gain is adjusted such that the motor 32 operates without any problem such as oscillation. The state information acquiring part 11 acquires, from the servo control apparatus 200, the state information s which is a state including current deviation information of the servo control apparatus 200 obtained by executing control according to a position command during learning on the basis of the respective coefficients $a_{1P}$, $b_{1P}$, $c_{1P}$, $a_{1I}$, $b_{1I}$, $c_{1I}$, $a_{1D}$, $b_{1D}$, and $c_{1D}$ of the transfer function of the controller gain of the current controller 27 in the servo control apparatus 200. The state information s corresponds to the environment state s in Q-learning. The values of the respective coefficients of the transfer function of the controller gain are also included in the state information s. Although these values may be acquired from the position controller 23, the speed controller 25, and the current controller 27, these values may be acquired from the action information generating part 123 that outputs the same as the adjustment information. The state information acquiring part 11 outputs the acquired state information s to the learning part 12.

The coefficients of the transfer function of the controller gain of the current controller 27 at the initial start time of the Q-learning may be generated by a user in advance. That is, in the present embodiment, the initial setting values of the coefficients of the transfer function of the controller gain created by the user are adjusted to optimal values by reinforcement learning.

The learning part 12 is a part that learns a value Q(s,a) when a certain action a is selected under a certain environment state s. Specifically, the learning part 12 includes the reward output part 121, the value function updating part 122, and the action information generating part 123.

The reward output part 121 is a part that calculates a reward when the action a is selected under a certain state s. Here, a set (a current deviation set) of current deviations which are state variables of the state s will be denoted by PD(s), and a current deviation set which is state variables related to state information s' changed from the state s due to correction of the action information a (the respective coefficients of the transfer function of the controller gain) is denoted by PD(s'). Moreover, the value of the current deviation in the state s is a value calculated on the basis of a predetermined evaluation function f(PD(s)).

The following functions can be used as the evaluation function f, for example. A function that calculates an integral value of an absolute value of a current deviation $$\int |e| dt \quad \text{(Expression 4)}$$

A function that calculates an integral value of a 2n-th power (n is a natural number) of an absolute value of a current deviation $$\int e^{2n} dt (n \text{ is a natural number}) \quad \text{(Expression 5)}$$

A function that calculates a maximum value of an absolute value of a current deviation $$\text{Max}\{|e|\} \quad \text{(Expression 6)}$$

The reward output part 121 sets the value of a reward to a negative value when the value f(PD(s')) of the current deviation of the servo control apparatus 200 operated on the basis of the coefficients of the transfer function of the controller gain of the current controller 27 after the correction related to the state information s' corrected by the action information a is larger than the value f(PD(s)) of the current deviation of the servo control apparatus 200 operated on the basis of the coefficients of the transfer function of the controller gain of the current controller 27 before correction related to the state information s before being corrected by the action information a.

The reward output part 121 sets the value of a reward to a positive value when the value f(PD(s')) of the current deviation of the servo control apparatus 200 operated on the basis of the coefficients of the transfer function of the controller gain of the current controller 27 after the correction related to the state information s' corrected by the action information a is smaller than the value f(PD(s)) of the current deviation of the servo control apparatus 200 operated on the basis of the coefficients of the transfer function of the controller gain of the current controller 27 before correction related to the state information s before being corrected by the action information a.

The reward output part 121 sets the value of a reward to zero when the value f(PD(s')) of the current deviation of the servo control apparatus 200 operated on the basis of the coefficients of the transfer function of the controller gain of the current controller 27 after the correction related to the state information s' corrected by the action information a is equal to the value f(PD(s)) of the current deviation of the servo control apparatus 200 operated on the basis of the coefficients of the transfer function of the controller gain of the current controller 27 before correction related to the state information s before being corrected by the action information a.

Furthermore, the negative value when the value f(PD(s')) of the current deviation in the state s' after execution of the action a is larger than the value f(PD(s)) of the current deviation in the previous state s may increase according to a proportion. That is, the negative value may increase according to the degree of increase in the current deviation. In contrast, the positive value when the value f(PD(s')) of the current deviation in the state s' after execution of the action a is smaller than the value f(PD(s)) of the current deviation in the previous state s may increase according to a proportion. That is, the positive value may increase according to the degree of decrease in the current deviation.

The value function updating part 122 updates the value function Q stored in the value function storing part 14 by performing Q-learning with respect to the coefficients of the transfer function of the controller gain of the current controller 27 on the basis of the state s, the action a, the state s' when the action a was applied to the state s, and the value of the reward calculated in the above-described manner.

The update of the value function Q may be performed by online learning, batch learning, or mini-batch learning. Online learning is a learning method of applying a certain action a to a present state s and updating the value function Q immediately whenever the state s transitions to a new state s'. Batch learning is a learning method of applying a certain action a to a present state s and repeated attaining of transition from the state s to a new state s', collecting learning data, and updating the value function Q using all the collected learning data. Mini-batch learning is a learning method which is intermediate between online learning and batch learning and involves updating the value function Q whenever a certain amount of learning data is collected.

The action information generating part 123 selects the action a in the process of Q-learning with respect to the present state s. The action information generating part 123 generates the action information a and outputs the generated action information a to the action information output part 13 in order to perform an operation (corresponding to the action a of Q-learning) of correcting the respective coefficients of the transfer function of the controller gain of the current controller 27 of the servo control apparatus 200 in the process of Q-learning. More specifically, the action information generating part 123 adds or subtracts the coefficients $a_{1P}$, $b_{1P}$, $c_{1P}$, $a_{1I}$, $b_{1I}$, $c_{1I}$, $a_{1D}$, $b_{1D}$, and $c_{1D}$ of the transfer function of the controller gain included in the action a incrementally (for example, a step of approximately 0.01) with respect to the respective coefficients of the transfer function of the controller gain of the current controller 27 included in the state s, for example.

When the coefficients of the transfer function of the controller gain of the current controller 27 are increased or decreased, the state s transitions to the state s', and a plus reward (a positive reward) is returned, the action information generating part 123 may select a policy of selecting such an action a' that further decreases the value of the current deviation such as incrementally increasing or decreasing the respective coefficients of the transfer function of the controller gain of the current controller 27 similar to the previous action as the next action a'.

In contrast, when a minus reward (a negative reward) is returned, the action information generating part 123 may select a policy of selecting such an action a' that decreases the current deviation to be smaller than the previous value such as incrementally decreasing or increasing the respective coefficients of the transfer function of the controller gain of the current controller 27 contrarily to the previous action as the next action a', for example.

The action information generating part 123 may select a policy of selecting the action a' according to a known method such as a greedy method of selecting an action a' having the highest value Q(s,a) among the values of presently estimated actions a and an ε-greedy method of randomly selecting an action a' with a certain small probability ε and selecting an action a' having the highest value Q(s,a) in other cases.

The action information output part 13 is a part that transmits the action information a output from the learning part 12 to a learning target controller (the current controller 27) of the servo control apparatus 200. As described above, the learning target controller finely adjusts the present state s (that is, each of the presently set coefficients of the transfer function of the controller gain of the current controller 27) on the basis of the action information to thereby transition to the next state s' (that is, each of the corrected coefficients of the transfer function of the controller gain).

The value function storing part 14 is a storage device that stores the value function Q. The value function Q may be store as a table (hereinafter referred to as an action-value table) for each state s and each action a, for example. The value function Q stored in the value function storing part 14 is updated by the value function updating part 122. Moreover, the value function Q stored in the value function storing part 14 may be shared with other machine learning devices 100. When the value function Q is shared by a plurality of machine learning devices 100, since reinforcement learning can be performed in a manner of being distributed to the respective machine learning devices 100, it is possible to improve the reinforcement learning efficiency.

The optimal action information output part 15 generates action information a (hereinafter referred to as "optimal action information") for causing the transfer function of the controller gain of the current controller 27 to perform an operation of maximizing the value Q(s,a) on the basis of the value function Q updated by the value function updating part 122 performing the Q-learning with respect to the coefficients of the transfer function of the controller gain of the current controller 27. More specifically, the optimal action information output part 15 acquires the value function Q stored in the value function storing part 14. As described above, the value function Q is updated by the value function updating part 122 performing the Q-learning with respect to the coefficients of the transfer function of the controller gain of the current controller 27. The optimal action information output part 15 generates the action information on the basis of the value function Q and outputs the generated action information to the learned current controller 27 of the servo control apparatus 200. The optimal action information includes information that corrects the respective coefficients of the transfer function of the controller gain of the current controller 27 similarly to the action information that the action information output part 13 outputs in the process of Q-learning. In this manner, the machine learning device 100 can obtain an appropriate value function for adjustment of the coefficients $a_i$, $b_j$, and $c_k$ of the transfer function of the controller gain of the current controller 27 and simplify optimization of the coefficients $a_{1P}$, $b_{1P}$, $c_{1P}$, $a_{1I}$, $b_{1I}$, $c_{1I}$, $a_{1D}$, $b_{1D}$, and $c_{1D}$.

Next, a case of performing Q-learning of the coefficients $a_{2P}$, $b_{2P}$, $c_{2P}$, $a_{2I}$, $b_{2I}$, $c_{2I}$, $a_{2D}$, $b_{2D}$, and $c_{2D}$ of the controller gain of the speed controller 25 subsequently to the end of learning of the controller gain of the current controller 27 will be described briefly. As described above, in Q-learning of the controller gain of the speed controller 25, the optimal coefficients of the current controller 27 are selected on the basis of the learning results of the current controller 27. The coefficients of the position controller 23 are set arbitrarily (for example, set to fixed values that do not depend on the phase as in the conventional technique) so that the controller gain is adjusted such that the motor 32 operates without any problem such as oscillation. In Q-learning of the controller gain of the speed controller 25, the state information acquiring part 11, the learning part 12 (the reward output part 121, the value function updating part 122, and the action information generating part 123), the action information output part 13, the value function storing part 14, and the optimal action information output part 15 perform processes equivalent to those during learning of the controller gain of the current controller 27. That is, the machine learning device 100 performs machine learning such that, in the above description of the machine learning of the controller gain of the current controller 27, the current controller 27 is read as the speed controller 25, the coefficients $a_{1P}$, $b_{1P}$, $c_{1P}$, $a_{1I}$, $b_{1I}$, $c_{1I}$, $a_{1D}$, $b_{1D}$, and $c_{1D}$ of the controller gain of the current controller 27 are read as the coefficients $a_{2P}$, $b_{2P}$, $c_{2P}$, $a_{2I}$, $b_{2P}$, $c_{2P}$, $a_{2D}$, $b_{2D}$, and $c_{2D}$ of the controller gain of the speed controller 25, and the current deviation is read as the speed deviation.

Next, a case of performing Q-learning of the coefficients $a_{3P}$, $b_{3P}$, $c_{3P}$, $a_{3I}$, $b_{3I}$, $c_{3I}$, $a_{3D}$, $b_{3D}$, and $c_{3D}$ of the controller gain of the position controller 23 subsequently to the end of learning of the controller gain of the current controller 27 and the speed controller 25 will be described briefly. As described above, in Q-learning of the controller gain of the position controller 23, the optimal coefficients of the current controller 27 and the speed controller 25 are selected on the basis of the learning results of the current controller 27 and the speed controller 25. In Q-learning of the controller gain of the position controller 23, the state information acquiring part 11, the learning part 12 (the reward output part 121, the value function updating part 122, and the action information generating part 123), the action information output part 13, the value function storing part 14, and the optimal action information output part 15 perform processes equivalent to those during learning of the controller gain of the current controller 27. That is, the machine learning device 100 performs machine learning such that, in the above description of the machine learning of the controller gain of the current controller 27, the current controller 27 is read as the position controller 23, the coefficients $a_{1P}$, $b_{1P}$, $c_{1P}$, $a_{1I}$, $b_{1I}$, $c_{1I}$, $a_{1D}$, $b_{1D}$, and $c_{1D}$ of the controller gain of the current controller 27 are read as the coefficients $a_{3P}$, $b_{3P}$, $c_{3P}$, $a_{3I}$, $b_{3I}$, $c_{3I}$, $a_{3D}$, $b_{3D}$, and $c_{3D}$ of the controller gain of the position controller 23, and the current deviation is read as the position deviation.

By performing the machine learning sequentially with respect to the current controller 27, the speed controller 25, and the position controller 23 in the above-described manner, the servo control apparatus 200 can select optimal values of the respective coefficients of the transfer function of the controller gain on the basis of the machine learning. By doing so, even when the inductance of the position controller 23 changes according to the phase of the motor, it is possible to suppress uneven rotation of the motor. As described above, by using the machine learning device 100 according to the present invention, it is possible to adjust the controller gain appropriately according to the phase of the motor.

Hereinabove, the functional blocks included in the servo control apparatus 200 and the machine learning device 100 have been described. In order to realize these functional blocks, the servo control apparatus 200 and the machine learning device 100 each include an arithmetic processing part such as a central processing part (CPU). The servo control apparatus 200 and the machine learning device 100 each further include an auxiliary storage device such as a hard disk drive (HDD) for storing various control programs such as application software or an operating system (OS) and a main storage device such as a random access memory (RAM) for storing data temporarily required when the arithmetic processing device executes a program.

In each of the servo control apparatus 200 and the machine learning device 100, the arithmetic processing device reads an application and an OS from the auxiliary storage device, and develops the read application software and OS in the main storage device to perform arithmetic processing on the basis of the read application software and OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 100 involves a large amount of computation associated with the machine learning, graphics processing parts (GPUs) may be mounted on a personal computer and be used for arithmetic processing associated with the machine learning using a technique called general-purpose computing on graphics processing parts (GPGPUs). In this way, high speed processing can be performed. Furthermore, in order to perform higher speed processing, a computer cluster may be built using a plurality of computers equipped with such GPUs, and the plurality of computers included in the computer cluster may perform parallel processing.

Operation of Present Embodiment

Figure 5:
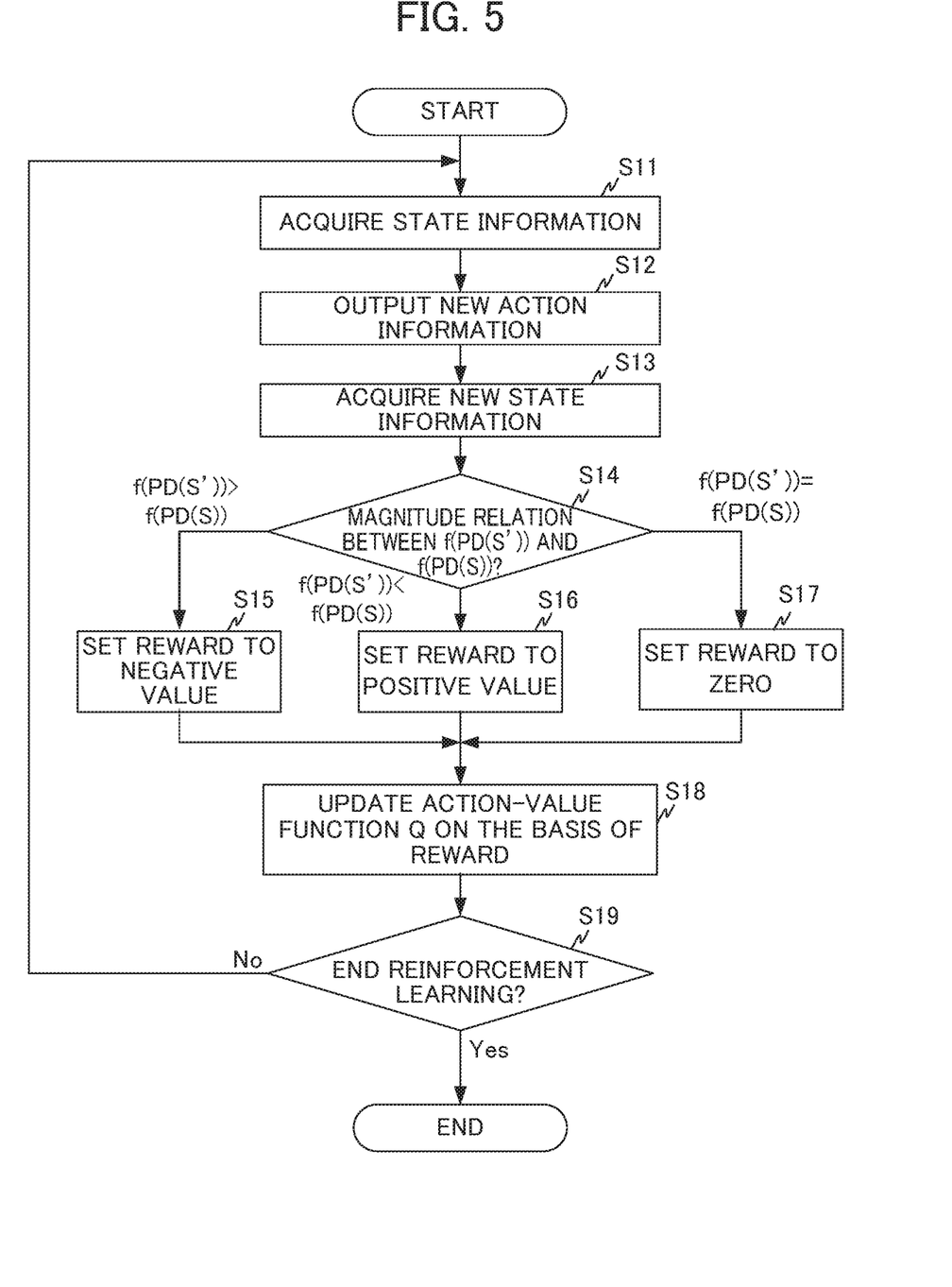
FIG. 5 is a flowchart for describing an operation during machine learning, of the machine learning device according to the embodiment of the present invention.

Next, an operation of the machine learning device 100 during Q-learning according to the present embodiment will be described with reference to the flowchart of FIG. 5. In the description of the flowchart of FIG. 5, for the sake of simplicity, the position controller 23, the speed controller 25, and the current controller 27 will be referred to simply as a controller, and a positional deviation, a speed deviation, and a current deviation will be referred to simply as a deviation.

In step S11, the state information acquiring part 11 acquires the state information s from the servo control apparatus 200. The acquired state information is output to the value function updating part 122 and the action information generating part 123. As described above, the state information s is information corresponding to the environment state s of Q-learning and includes a deviation set PD(s), the phase of the motor 32, and the coefficients of the transfer function of the controller gain at the time of step S11. For example, when the learning target is the current controller 27, a current deviation obtained by the subtractor 26 subtracting a current feedback from the current command is included as the deviation PD(s). The phase of the motor 32 calculated by the phase calculating part 21 is also included. Furthermore, the coefficients $a_{1P}$, $b_{1P}$, $c_{1P}$, $a_{1I}$, $b_{1I}$, $c_{1I}$, $a_{1D}$, $b_{1D}$, and $c_{1D}$ of the transfer function of the controller gain of the current controller 27 are included.

In step S12, the action information generating part 123 generates new action information a and outputs the generated new action information a to the learning target controller via the action information output part 13. The action information generating part 123 outputs the new action information a on the basis of the above-described policy. The controller having received the action information a drives the control target device 300 including the motor 32 according to the state s' obtained by correcting the respective coefficients of the transfer function of the controller gain related to the present state s on the basis of the received action information. As described above, the action information corresponds to the action a in Q-learning.

In step S13, the state information acquiring part 11 acquires a deviation PD(s') in the new state s' from a subtractor (for example, the subtractor 26 when the learning target is the current controller 27) corresponding to the input of the learning target controller. In this way, the state information acquiring part 11 acquires the deviation set PD(s') in the state s'. The acquired state information is output to the reward output part 121.

In step S14, the reward output part 121 determines a magnitude relation between the value f(PD(s')) of the deviation in the state s' and the value f(PD(s)) of the deviation in the state s. When it is determined that f(PD(s'))>f(PD(s)), the reward is set to a negative value in step S15. When f(PD(s'))<f(PD(s)), the reward is set to a positive value in step S16. When f(PD(s'))=f(PD(s)), the reward is set to zero in step S17. Weighting may be applied to the negative and positive reward values. When any one of steps S15, S16, and S17 ends, the flow proceeds to step S18.

In step S18, the value function updating part 122 updates the value function Q stored in the value function storing part 14 on the basis of the value of the reward calculated in any one of the steps. Although step S18 illustrates online update, the online update may be replaced with batch update or mini-batch update.

In step S19, the learning part 12 determines whether a condition for ending reinforcement learning is satisfied. The condition for ending the reinforcement learning is that the above-described process has been repeated a predetermined number of times or has been repeated for a predetermined period. When the condition for ending the reinforcement learning has not yet been satisfied, a determination result of No is obtained in step S19, and the process returns to step S11 again. By repeating the above-described process, the value function Q converges to an appropriate value. On the other hand, when the condition for ending the reinforcement learning is satisfied, a determination result of Yes is obtained in step S19, and the process ends.

As described above, in the present embodiment, learning is performed sequentially, targeting one controller among the three controllers of the position controller 23, the speed controller 25, and the current controller 27, rather than performing learning simultaneously for the three controllers. That is, the processes of steps S11 to S19 are performed sequentially for the respective controllers. When the processes of steps S11 to S19 are performed for all controllers, the operation of the machine learning device 100 during Q-learning ends.

In the present embodiment, due to the operation described above with reference to FIG. 5, by using the machine learning device 100, it is possible to obtain an appropriate value function for adjustment of the coefficients of the transfer function of the controller gain of each controller and to simplify the optimization of the respective coefficients.

Figure 6:
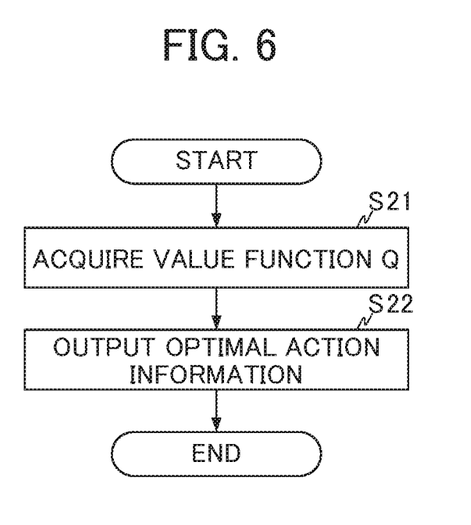
FIG. 6 is a flowchart for describing an operation when outputting optimal action information, of the machine learning device according to the embodiment of the present embodiment.

Next, the operation during generation of optimal action information by the optimal action information output part 15 will be described with reference to the flowchart of FIG. 6. First, in step S21, the optimal action information output part 15 acquires the value function Q stored in the value function storing part 14. The value function Q is updated by the value function updating part 122 performing Q-learning as described above.

In step S22, the optimal action information output part 15 generates optimal action information on the basis of the value function Q and outputs the generated optimal action information to the respective controllers of the servo control apparatus 200. The optimal action information is information for appropriately adjusting the coefficients of the transfer function of the controller gain of each controller.

In the servo control apparatus 200, the coefficients of the transfer function of the controller gain are optimized on the basis of the optimal action information, and uneven rotation is diminished and the value of the positional deviation is reduced even when the inductance of the position controller 23 changes according to the phase. As described above, by using the machine learning device 100 according to the present embodiment, it is possible to adjust the controller gain appropriately according to the phase of the motor.

Figure 7:
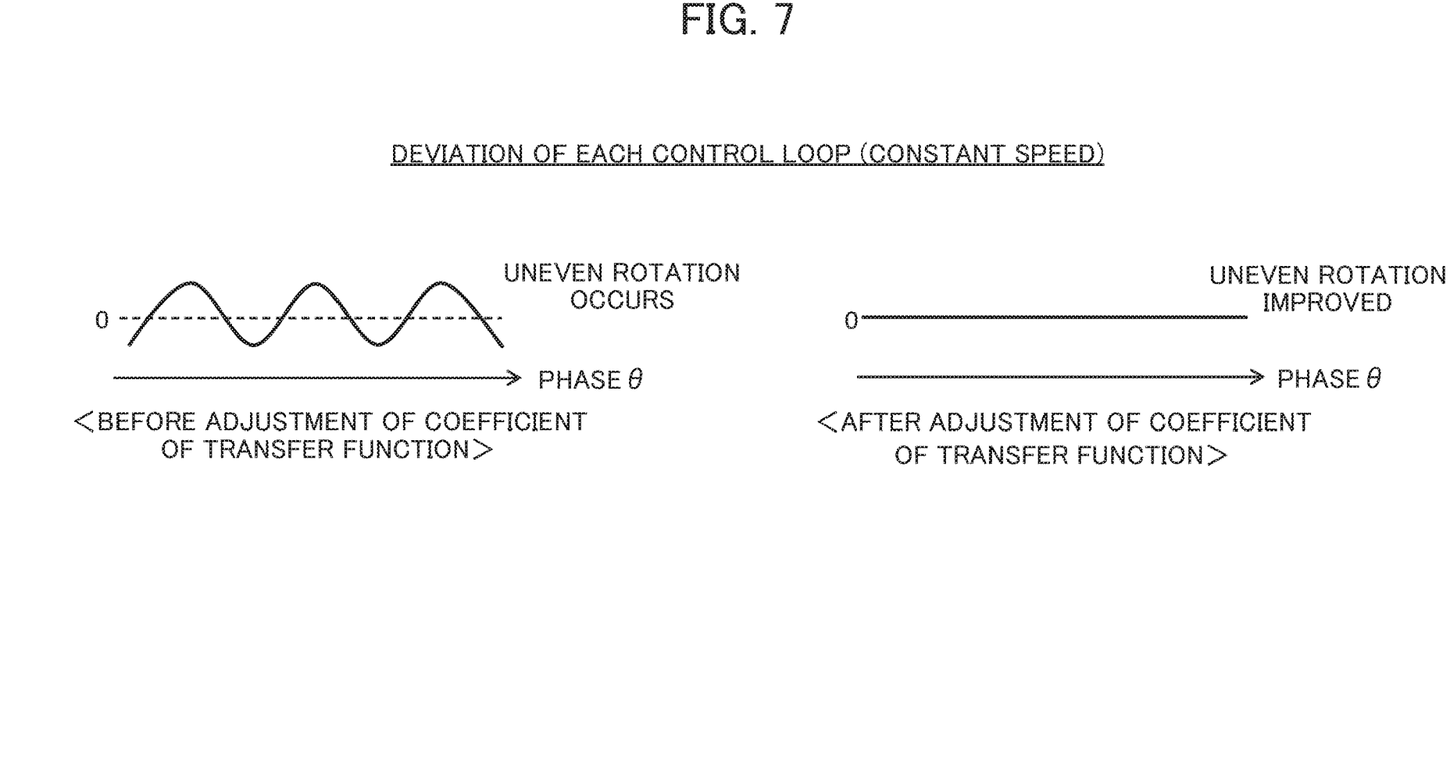
FIG. 7 is a schematic diagram for describing the advantages of the embodiment of the present invention.

These advantages will be described with reference to FIG. 7. FIG. 7 illustrates a deviation in each control loop when the motor 32 rotates at a constant speed.

First, <Before adjustment of coefficients of transfer function> on the left side of the drawing illustrates a state in which, when the phase of the motor 32 changes with rotation of the rotor of the motor 32, since the inductance of the motor changes according to a change in the phase, uneven rotation occurs if the gain is constant. As described above, in an ordinary technique, since the coefficients of the transfer function are not adjusted, uneven rotation occurs in this manner. Due to this, for example, when the control target device 300 is a machine tool, since uneven feeding of a work occurs, it is not possible to perform machining uniformly on the machining surface of the work.

In contrast, <After adjustment of coefficients of transfer function> on the right side of the drawing illustrates a state in which adjustment of the coefficients of the transfer function is performed according to the change in the phase of the motor 32 by the process described above whereby the gain is adjusted appropriately and uneven rotation is improved. Due to this, according to the present embodiment, when the control target device 300 is a machine tool, for example, since it is possible to prevent occurrence of uneven feeding of a work, it is possible to perform machining uniformly on the machining surface of the work. That is, in the present embodiment, since the controller gain is adjusted appropriately according to the phase of the motor, an effect advantageous over an ordinary technique is obtained.

Note that the above-described respective devices included in the servo control system can be realized respectively by hardware, software, or a combination thereof. Moreover, a servo control method performed by cooperation of the above-described respective devices included in the servo control system can also be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be provided to a computer by using any of various types of transitory computer readable media. Examples of the transitory computer readable media include electric signals, optical signals and electromagnetic waves. A transitory computer readable medium can provide programs to a computer through a wired communication path such as an electrical cable, optical fiber, or the like or a wireless communication path.

The above-described embodiment is a preferred embodiment of the present invention. However, the scope of the present invention is not limited to the embodiment only but the present invention can be embodied in various modifications without departing from the spirit of the present invention. Examples of modifications will be described below.

<Modification in which Servo Control Apparatus Includes Machine Learning Device>

Although the machine learning device 100 is configured as a device separate from the servo control apparatus 200 in the above-described embodiments, some or all of the functions of the machine learning device 100 may be realized by the servo control apparatus 200.

<Freedom in System Configuration>

In the above-described embodiments, the machine learning device 100 and the servo control apparatus 200 are communicably connected as a one-to-one correlation. However, for example, one machine learning device 100 and a plurality of servo control apparatuses 200 may be communicably connected via a network and the machine learning of each of the servo control apparatuses 200 may be performed. In this case, a distributed processing system may be adopted, in which respective functions of the machine learning device 100 are distributed to a plurality of servers as appropriate. Alternatively, respective functions of the machine learning device 100 may be realized using a virtual server function or the like on a cloud.

<Modification of Motor 32>

In the above-described embodiment, it was assumed that the motor 32 is a rotation motor. It was also assumed that machine learning is performed for an operation in which the rotor of the motor 32 makes one revolution or more in a positive direction and/or a negative direction at a constant speed. Instead of this, the motor 32 may be replaced with a linear motor rather than the rotation motor. In this case, machine learning may be performed for an operation in which a mover of the linear motor moves between one end of an operating region on a stator to the other end in an either direction.

<Modification of Control Method of Controller>

In the above-described embodiment, it was assumed that the three controllers of the position controller 23, the speed controller 25, and the current controller 27 perform PID control. Instead of this, some or all controllers may perform PI control or proportional control only. For example, when the speed controller 25 and the current controller 27 perform PI control and the position controller 23 performs proportional control, the transfer functions of the controller gains of the respective controllers may be represented by the following expressions (Expression 7). Transfer function of current controller 27:

$$K_1(s,\Theta) = K_{1P}(\Theta) + K_{1I}(\Theta)/s$$

Transfer function of speed controller 25:

$$K_2(s,\Theta) = K_{2P}(\Theta) + K_{2I}(\Theta)/s$$

Transfer function of position controller 23:

$$K_3(s,\Theta) = K_{3P}(\Theta) \quad \text{(Expression 7)}$$

<Modification of Coefficients of Transfer Function of Controller>

In the above-described embodiment, although the coefficients of the transfer functions of the controller gains (for example, the transfer function $K_1(s,\Theta)$ of the transfer function of the controller gain of the current controller 27, the transfer function $K_2(s,\Theta)$ of the controller gain of the speed controller 25, and the transfer function $K_3(s,\Theta)$ of the controller gain of the position controller 23) are one-dimensional functions, respectively, as illustrated in Expression 3, the coefficients are not limited thereto. For example, the transfer function $K_1(s,\Theta)$ $(=K_{1P}(\Theta)+K_{1I}(\Theta)/s+K_{1D}(\Theta)s)$ of the controller gain of the current controller 27 may be a multi-dimensional function of $\Theta$ as below.

$$K_{1P}(\Theta) = \Sigma_{1 \leq i \leq L}\{a_{1P}(i) \cdot \sin(i\Theta + b_{1P}(i))\} + c_{1P}$$

$$K_{1I}(\Theta) = \Sigma_{1 \leq j \leq M}\{a_{1I}(j) \cdot \sin(j\Theta + b_{1I}(j))\} + c_{1I}$$

$$K_{1D}(\Theta) = \Sigma_{1 \leq k \leq N}\{a_{1D}(k) \cdot \sin(k\Theta + b_{1D}(k))\} + c_{1D} \quad \text{(Expression 8)}$$

Here, L, M, and N are integers of 1 or more.

Similarly, the transfer function $K_2(s,\Theta)$ of the controller gain of the speed controller 25 and the transfer function $K_3(s,\Theta)$ of the controller gain of the position controller 23 may be multi-dimensional functions of $\Theta$. Although the function "sin" is used in the present embodiment, the function is not limited thereto. For example, "cos" may be used instead of "sin". Furthermore, rather than calculating the values of the coefficients using such expressions, a parameter table that correlates the values of the coefficients of the transfer function of the controller gain and the value of the phase $\Theta$ may be created by machine learning.

<Selection of Learning Target Controller>

In the above-described embodiment, learning is performed sequentially, targeting one controller among the three controllers of the position controller 23, the speed controller 25, and the current controller 27, and learning is finally performed for all the three controllers. However, the present invention is not limited thereto. For example, learning may be performed for any one of the three controllers. For example, learning may be performed for the current controller 27 only, and learning may be performed for the speed controller 25 and the controller 27 only.

<Current Command Value>

A current command value has an upper limit. Therefore, an allowable value CCmax may preferably be set to be equal to or smaller than an upper limit, for example, so that the current command value does not exceed the allowable value CCmax. Therefore, the reward is computed by considering whether the current command value has reached the allowable value CCmax rather than computing the reward on the basis of the deviation PD(s). Specifically, the state information acquiring part 11 observes a position-forward-controlled current command value CC(s) which is the output of the adder 107 in the state s. When the state information acquiring part 11 observes that any one of the current command values observed in the state s exceeds the allowable value CCmax, the reward output part 121 sets the reward to a negative value regardless of the reward computation result based on the deviation PD(s) and the current command value in the previous state.

When the current command value observed in the state s does not exceed the allowable value CCmax, an evaluation function q of the current command value CC(s) may be set in advance, and the reward based on the current command value CC(s) may be calculated similarly to the deviation PD(s) on the basis of an evaluation value q(CC(s)) of the current command value CC(s). In this case, the reward output part 121 may add the reward based on the deviation PD(s) and the reward based on the current command value CC(s) by applying weighting to both rewards. Moreover, weighting may be applied to the evaluation function of the deviation PD(s) and the evaluation function q of the current command value CC(s), the weighted evaluation functions may be added, and the reward may be determined using the weighted evaluation function.

EXPLANATION OF REFERENCE NUMERALS

1: Servo control system
100: Machine learning device

11: State information acquiring part
12: Learning part
121: Reward output part
122: Value function updating part
123: Action information generating part
13: Action information output part
14: Value function storing part
15: Optimal action information output part
200: Servo control apparatus
21: Phase calculating part
22, 24, 26: Subtractor
23: Position controller
25: Speed controller
27: Current controller
28: Integrator
300: Control target device
31: Driving amplifier
32: Motor
33: Machine

What is claimed is:

1. A machine learning device that performs reinforcement learning with respect to a servo control apparatus that controls an operation of a control target device having a motor, the machine learning device comprising:
a memory configured to store a program: and
a processor configured to execute the program and control the machine learning device to:
output action information including adjustment information of coefficients of a transfer function of a controller gain to a controller included in the servo control apparatus;
acquire, from the servo control apparatus, state information including a deviation between an actual operation of the control target device and a command input to the controller, a phase of the motor, and the coefficients of the transfer function of the controller gain when the controller operates the control target device on the basis of the action information;
output a value of a reward in the reinforcement learning on the basis of the deviation included in the state information; and
update an action-value function on the basis of the value of the reward, the state information, and the action information so that the action information is updated and the coefficients of the transfer function of the controller gain are adjusted according to the value of the reward, the action information, and the state information including the phase of the motor so that uneven rotation of the motor is improved.

2. The machine learning device according to claim 1, wherein
the servo control apparatus is a servo control apparatus that performs feedback control for correcting the command input to the controller, and
the processor is further configured to control the machine learning device to acquire a difference between the command input to the controller and a feedback value of the feedback control as the deviation.

3. The machine learning device according to claim 1, wherein
the controller is a combination of controllers that perform position control, speed control, and current control, and
the machine learning device selects the controller that performs current control, the controller that performs speed control, and the controller that performs position control in that order as a reinforcement learning target when the machine learning device performs the reinforcement learning by selecting any one of the controllers as a target and then performs the reinforcement learning by selecting another controller as a target.

4. The machine learning device according to claim 1, wherein
the phase of the motor is calculated on the basis of a position command for controlling the operation of the control target device.

5. The machine learning device according to claim 1, wherein
the transfer function of the controller gain includes a phase of the motor as a variable.

6. A servo control system including the machine learning device according to claim 1 and the servo control apparatus, wherein
the servo control apparatus includes
a memory configured to store a program: and
a processor configured to execute the program and control the servo control apparatus to:
calculate a phase of the motor on the basis of a position command for controlling an operation of the control target device and output the calculated phase of the motor to the machine learning device and the controller.

7. A machine learning method of a machine learning device that performs reinforcement learning with respect to a servo control apparatus that controls an operation of a control target device having a motor, the machine learning method comprising:
an action information output step of outputting action information including adjustment information of coefficients of a transfer function of a controller gain to a controller included in the servo control apparatus;
a state information acquisition step of acquiring, from the servo control apparatus, state information including a deviation between an actual operation of the control target device and a command input to the controller, a phase of the motor, and the coefficients of the transfer function of the controller gain when the controller operates the control target device on the basis of the action information;
a reward output step of outputting a value of a reward in the reinforcement learning on the basis of the deviation included in the state information; and
a value function updating step of updating an action-value function on the basis of the value of the reward, the state information, and the action information so that the action information is updated and the coefficients of the transfer function of the controller gain are adjusted according to the value of the reward, the action information, and the state information including the phase of the motor so that uneven rotation of the motor is improved.

* * * * *